United States Patent [19]

Nguyen et al.

[11] Patent Number: 4,582,574

[45] Date of Patent: Apr. 15, 1986

[54] PREPARATION OF CAPACITOR ELECTRODES

[75] Inventors: Trung H. Nguyen, Norton; Allan B. McPherson, North Adams, both of Mass.

[73] Assignee: Sprague Electric Company, North Adams, Mass.

[21] Appl. No.: 765,742

[22] Filed: Aug. 15, 1985

[51] Int. Cl.⁴ .............................................. C25D 11/12
[52] U.S. Cl. ........................................ 204/27; 204/42; 204/58
[58] Field of Search ......................... 204/42, 58, 27, 28

[56] References Cited

U.S. PATENT DOCUMENTS

| | | | |
|---|---|---|---|
| 2,052,575 | 9/1936 | Lilienfeld | 175/315 |
| 4,481,084 | 11/1984 | Chen et al. | 204/42 |
| 4,537,665 | 8/1985 | Nguyen et al. | 204/29 |

FOREIGN PATENT DOCUMENTS

| | | | |
|---|---|---|---|
| 57-115815 | 7/1982 | Japan | 204/42 |
| 398825 | 9/1933 | United Kingdom | 204/42 |

OTHER PUBLICATIONS

Alien Property Custodian, Miyata, Akira; U.S. Ser. No. 362,879, May 18, 1943.

*Primary Examiner*—G. L. Kaplan

[57] ABSTRACT

Aluminum capacitor foil which has been etched for low-voltage applications is rendered usable in intermediate to high voltage capacitors by anodizing the foil in two-stages; first a low voltage stage in an adipate electrolyte and then a higher voltage stage in a borate electrolyte. The fine etch structure of the low-voltage etch is thereby not plugged in the second, higher voltage formation stage, whereby the foil is suitable for intermediate to high-voltage capacitor use.

8 Claims, No Drawings

PREPARATION OF CAPACITOR ELECTRODES

BACKGROUND OF THE INVENTION

This invention relates to a two-stage anodization process by which foil that has been etched at up to 150 V for low-voltage use (for capacitors rated to 100 V) is made suitable for intermediate to high-voltage use.

Foil that has been etched for low-voltage use typically has a fine etch structure. When the etching is electrochemical using direct current, the etch structure consists of narrow tubes or tunnels which change direction frequently and is quite filamentary. For low-voltage capacitor applications (0–100 V) the barrier-layer anodized film that is formed is relatively thin and covers the interior of these tunnels without filling or plugging them with anodic oxide, so that the surface area remains high and the fill or working capacitor electrolyte can penetrate into these tunnels.

Foil that has been electrochemically etched using direct current for high-voltage use (above 250 V) typically has a rather coarse tunnel etch structure. The tunnels are wider and not as randomly arranged, and the etch structure has been described as resembling a child's jungle gym. The wider tunnels can accommodate the thicker anodic oxide films needed for high voltage operations.

Foil that has been etched using alternating current has a very different etch structure. Pits rather than tunnels are formed, and the etch structure resembles bunches of grapes or cauliflower flowerets. A low-voltage AC etch produces pits which are very fine and can be plugged easily by anodic oxide, thereby reducing surface area and hence capacitance. A high-voltage AC etch produces deeper more rounded pits which can accommodate a thicker anodic oxide layer without drastically reducing the enhanced surface area of the foil produced by the etch.

Foil for intermediate voltage use (150 to 250 V) has a structure intermediate those described above, as is shown by both etch structures becoming more symmetrical and wider.

Thus, capacitor manufacturers must inventory a variety of etched foils in order to be able to produce capacitors throughout the various voltage ranges. To maintain a large inventory of each range of etched foils is expensive; not to do so runs the risk of running short of suitable foil in the case of a large demand in a particular voltage range.

SUMMARY OF THE INVENTION

In accordance with this invention low-voltage etched aluminum foil is made suitable for intermediate to high-voltage use by a two-stage anodization process. The foil is anodized at a low-voltage in an adipate electrolyte in the first stage and then at a higher-voltage in a borate electrolyte in the second-stage. Both stages are operated at a temperature between 85° C. and the boiling point of the electrolyte and conveniently at 90° C.

The preferred adipate electrolyte is that disclosed by Nguyen and Hutchins in U.S. Pat. No. 4,537,665 issued Aug. 27, 1985, which is an aqueous solution containing 0.5 to 12% adipate and is preferably a 4.5% diammonium adipate solution.

The preferred borate electrolyte is a solution containing 5 to 10% boric acid, preferably 10%, to obtain the high resistivity needed in the second, higher voltage stage, e.g., at 200 V or above.

In the two-stage anodization of the present invention, foil which has been etched for low-voltage capacitor use, and which has a fine etch structure, can be anodized to higher voltages without plugging the fine etch structure. This result is obtained because the adipate first-stage anodization produces a thin dielectric oxide which does not use up much of the etch structure volume, and thus the second anodic oxide layer can be accommodated. As a result, it is possible to reduce the variety of foils in inventory and/or meet a large demand in the intermediate to high voltage range.

DESCRIPTION OF THE PREFERRED EMBODIMENTS

Foil which has been etched for low-voltage use, i.e. for capacitors with ratings of 100 V or less, was anodized first in adipic acid and then in boric acid. The adipate electrolyte, depending on the formation voltage desired, is an aqueous solution containing 0.5 to 12% adipate salt, preferably diammonium adipate. The boric acid electrolyte is an aqueous solution containing 5 to 10% boric acid suitable for anodizations to 200 V and above. Both anodization stages are carried out at between 85° C. and the boiling point of the electrolytes.

In the example below, foil etched at up to 150 V is anodized by (A) the process of the present invention, and compared with the same 150 V etched foil prepared by (B) a standard high-voltage technique, e.g. by a preboil to produce a hydrous oxide layer followed by a high-voltage anodization. A high-voltage etched foil is also included for comparison.

The "A" samples were anodized first in an aqueous 4.5% diammonium adipate system to 150 V, rinsed, and then anodized in an aqueous 10% boric acid solution to 280 V. The "B" samples were anodized by the standard high voltage technique of being boiled in water to form a hydrous oxide layer and then anodized to 280 V in the borate electrolyte.

Foil sample 1 was a standard DC etched low-voltage foil; sample 2 was an AC etched low-voltage foil; sample 3 was an experimental pulsed-DC etched foil which was anodized only by the adipate-borate process; and, sample 4 was a high-voltage DC etched foil (200–350 V).

The wet voltage, which is a qualitative measurement of the thickness of the anodic oxide film (average of 12 Å/V), and the capacitance in microfarads per square inch of foil were measured for each sample at 280 V$_f$.

TABLE

| Foil | Wet Voltage | Capacitance |
|------|-------------|-------------|
| 1A   | 329         | 4.85        |
| 1B   | 334         | 3.36        |
| 2A   | 331         | 5.34        |
| 2B   | 334         | 4.70        |
| 3A   | 327         | 4.41        |
| 4A   | 325         | 4.69        |
| 4B   | 327         | 4.80        |

The results show that there is little difference in capacitance when a high-voltage foil is used. However, when a low-voltage foil was used, the two-stage adipateborate formation of this invention gave higher capacitances than did the standard high-voltage anodization.

The results also show that the capacitances obtained for the "A" samples (the process of the present invention) compare well with that obtained for a standard high-voltage technique using high voltage foil (foil 4B). Thus, the present invention provides a method of anodizing low-voltage foil, when necessary, which yields a suitable product for high-voltage use.

What is claimed is:

1. A process for the preparation of capacitor electrodes of aluminum foil which has a fine etch structure as a result of having been etched for low-voltage use, said process comprising anodizing said foil at a low voltage in a first stage electrolyte comprising an adipate solution, rinsing said foil of said first electrolyte, and then anodizing said foil to a higher voltage in a second anodizing stage using a borate formation electrolyte, said fine etch structure on said foil is thereby not plugged, whereby said foil is made suitable for higher voltage capacitor use.

2. A process according to claim 1 wherein said adipate solution is a 0.5 to 12% adipate solution.

3. A process according to claim 2 wherein said adipate is diammonium adipate.

4. A process according to claim 3 wherein said adipate solution is a 4.5% diammonium adipate solution.

5. A process according to claim 1 wherein said borate solution is a 5 to 10% borate solution.

6. A process according to claim 5 wherein said borate solution is a 10% boric acid solution.

7. A process according to claim 1 wherein each of said adipate and said borate anodizations is carried out at a temperature between 85° C. and the boiling point of said solution.

8. A process according to claim 7 wherein each anodization temperature is 90° C.

* * * * *